United States Patent [19]

Scudder

[11] 4,277,885
[45] Jul. 14, 1981

[54] MACHINE FOR MANUFACTURING WREATHS

[76] Inventor: Monty Scudder, Bordentown-Chesterfield Rd. R.R.#2, Box 192, Trenton, N.J. 08620

[21] Appl. No.: 13,756

[22] Filed: Feb. 21, 1979

[51] Int. Cl.³ .................. B23P 19/04; A46D 3/04
[52] U.S. Cl. .............................. 29/780; 29/819; 57/3; 57/11; 300/14
[58] Field of Search .............. 29/780, 779, 819, 820, 29/419 R; 57/3, 10, 11; 242/7.21, 7.14, 4 BE; 300/2, 4, 14

[56] References Cited

U.S. PATENT DOCUMENTS

| | | |
|---|---|---|
| 250,392 | 12/1881 | Rice et al. .................... 57/3 |
| 635,039 | 10/1899 | Emerson ...................... 57/3 |
| 1,585,357 | 5/1926 | Anderson ..................... 57/24 |
| 1,801,388 | 4/1931 | Ruf . | 
| 2,248,572 | 7/1941 | Kelman ........................ 57/3 |
| 2,279,563 | 4/1942 | Dye ............................. 57/10 |
| 2,406,846 | 9/1946 | Muller ......................... 242/7.14 |
| 2,544,442 | 3/1951 | Boyce .......................... 57/3 |
| 2,613,139 | 10/1952 | Herold et al. ............... 57/206 |
| 2,685,477 | 8/1954 | Baumgartner ............... 300/2 |
| 2,747,649 | 5/1956 | Reed ............................ 57/3 |
| 2,993,332 | 7/1961 | Hughes ........................ 57/3 |
| 2,998,668 | 9/1961 | Guckelberg et al. ........ 57/3 |
| 3,000,167 | 9/1961 | Pierce et al. ................ 57/3 |
| 3,284,995 | 11/1966 | Haight ......................... 57/3 |
| 3,344,592 | 10/1967 | Geisinger .................... 57/3 |
| 3,590,567 | 7/1971 | Bonikowski et al. ....... 57/3 |
| 3,643,416 | 2/1972 | Andrews et al. ............ 57/3 |
| 3,780,514 | 12/1973 | Rodermund et al. ....... 57/24 |
| 3,942,310 | 3/1976 | Rodermund et al. ....... 57/24 |

FOREIGN PATENT DOCUMENTS

| | | | |
|---|---|---|---|
| 573050 | 3/1959 | Canada ........................... | 57/3 |
| 403069 | 10/1909 | France ........................... | 57/3 |

Primary Examiner—Daniel C. Crane
Attorney, Agent, or Firm—Frederick A. Zoda; John J. Kane; Albert Sperry

[57] ABSTRACT

Apparatus for the manufacture of circular wreaths, such as Christmas wreaths, is adapted for making either single-faced or double-faced wreaths, utilizing either artificial or natural wrapping materials.

Disclosed is an apparatus or machine for securing facing materials to an elongated, straight wire core to form a wreath section capable of being joined end to end with other similar sections in a separate, subsequent assembly operation to produce a circular wreath of selected diameter. The machine includes means for feeding a wire core in the direction of its length, while imparting intermittent rotational movement thereto about its own axis, with each such movement being on the order of approximately 180° of angular travel about the core axis. The opposite sides of the core are thus alternately presented to the operator for positioning of the wreath facing material in longitudinal contact with the core. As the core is fed in the direction of its length, a wrapping wheel through which the core is advanced is rotated for the purpose of spirally wrapping a wire about the core and the facing materials, to produce the completed wreath section. Means is included, readily controllable by an operator, for stopping and starting the wrapping operation with both the wrapping wheel and the core advancing means being jointly actuated or stopped, independently of a separately controlled means for controlling the side-for-side intermittent rotational movement of the core element.

2 Claims, 8 Drawing Figures

MACHINE FOR MANUFACTURING WREATHS

BACKGROUND OF THE INVENTION

1. Field of the Invention

The present invention relates to the general field or category of production machinery designed specifically for the purpose of securing wreath materials in enclosing relation to a core element to form an initially straight wreath section. The present apparatus is designed for manufacturing the wrapped sections, so that they can be packed compactly in a shipping container, in a minimum amount of space, to be assembled with one another at their destination to provide completed, circular wreaths.

2. Description of the Prior Art

Heretofore, there have been machines for wrapping a central core with a sheath or covering of flexible facing materials of various types. For example, machines have been devised for making chenille as disclosed in U.S. patent to Anderson, U.S. Pat. No. 1,585,357. Machines have been developed, further, for the purpose of making such articles as elongated ornamental garlands, as may be noted from Herold et al U.S. Pat. No. 2,613,139. It has further been proposed to provide apparatus for manufacturing wreaths, as in Rodermund et al U.S. Pat. No. 3,780,514.

However, such apparatus as has heretofore been proposed, has not in actuality been usable for the purpose of forming separate wreath sections, either of the single or the double-faced type, having the requisite relative rigidity and strength, and having their artificial or natural wrappings strongly secured about an associated core element. It is important, in a machine of the character described, that it be adapted for wrapping a core element with twigs and pieces of branches taken from live trees. The twigs or branches, thus, may differ from one another, and indeed would in almost every instance differ, in respect to their length, the thickness of the twig or branch, the length and spacing of the needles growing therefrom, or their general straightness. Machines heretofore devised for the purpose of forming wreaths or garlands have, further, in general not been adapted for permitting the wreath section to be single-faced or double-faced at the option of the manufacturer.

Still further, it is desirable that the completed wreath have a natural appearance, and that it have the general appearance of being fabricated by hand, rather than being so perfectly formed as to be obviously machine-made. The prior art machines, apart from their inability to handle sheaths, wrappings, or bundles of twigs of different shapes or sizes, have tended to produce wreaths that have a perfectly symmetrical sameness, a feature which is actually considered undesirable by the trade, since the ultimate purchasers prefer to display natural-looking, seemingly hand-made wreaths.

The prior art, it is believed, has failed to develop a machine which will speed up the fabrication of wreath sections of the type described above, so as to increase production and as a consequence reduce considerably the expense of wreath manufacture. Heretofore, wreaths, and in particular wreaths using natural materials taken from live evergreens, have been largely made by hand, a laborious, time-consuming and expensive procedure that presents obvious problems as regards the final cost to the ultimate purchaser.

SUMMARY OF THE INVENTION

The present invention, summarized briefly, seeks to overcome the problems and deficiencies noted in the prior art devices, through the provision of a machine which is designed to be operated by a single worker who may be relatively unskilled. The machine comprising the present invention, basically, includes a support frame, and on one end of the frame there is mounted, for slidable movement, a carriage adapted to releasably engage one end of an elongated, straight core element. The other end of the core element is releasably engaged in a rotatably mounted chuck. The chuck or spindle engaging the other end of the core element is intermittently rotated, under the control of the operator, through 180°. The opposite faces of the core element are thus alternately presented to the operator, so that the operator can position loose or bundled twigs or other wreath wrapping materials against first one face or the core element and then the opposite face. The core element, meanwhile, is advanced in the direction of its length, and as it advances, a wrapping wheel rotates thereabout, in a manner to spirally wrap a retaining wire about the facing materials and the core element. In this way, a straight, elongated wreath section is formed, to be assembled in end-to-end relation with other wreath sections subsequently in the form of continuously circular Christmas wreaths or the like.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
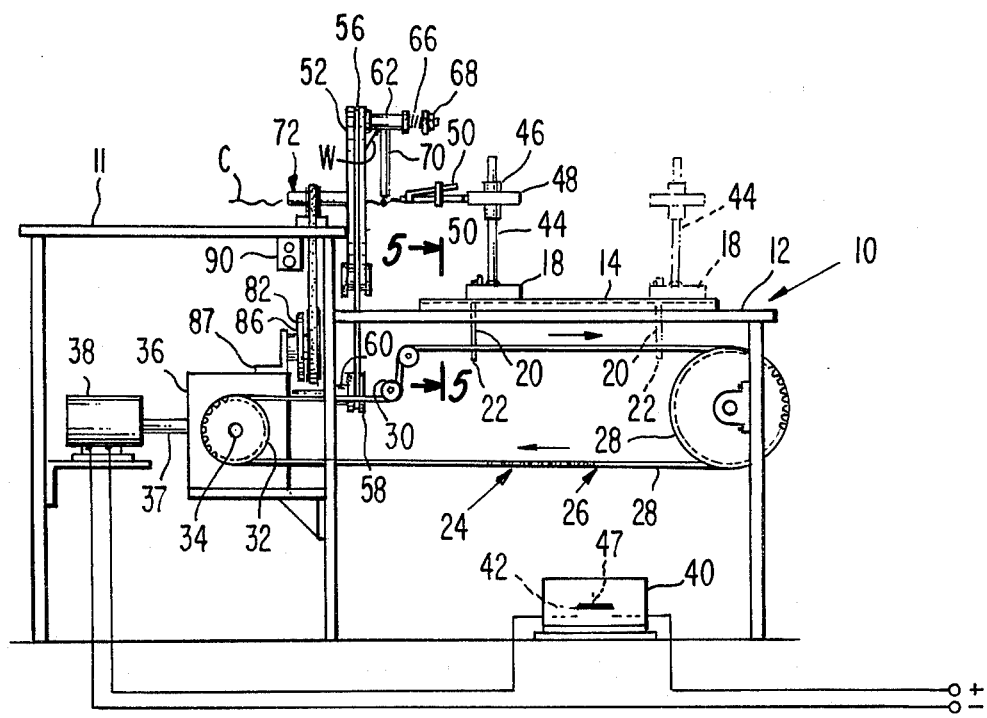
FIG. 1 is a side elevational view of a machine for manufacturing wreaths, constructed according to the present invention, in which a drive mechanism and associated electrical wiring have been illustrated somewhat diagrammatically.

Basically, the present invention may be considered as comprising three basic assemblies: a support frame and carriage structure, a wrapping wheel assembly, and a chuck assembly having a means for rotating the same.

Support Frame and Carriage

This portion of the machine comprising the present invention includes a support frame generally designated 10. This includes, at one end, an upwardly offset wrapping wheel and chuck support base 11 and, at the other end, a combined work table and carriage support base 12 horizontally mounted, in the presently preferred embodiment, at a lower elevation than the base 11. Base 11 and table 12 are assembled as components of a stationary support structure that provides a work station for a single operator, in a manner to be presently described.

Fixedly mounted upon the carriage support base 12, and extending longitudinally and centrally thereof, is a narrow, rectangular, carriage guide housing 14, formed over almost its entire length with an elongated, straight, longitudinally and centrally disposed carriage guide slot 16. Slidably mounted upon the housing 14 is a block-like carriage or follower 18, on which is pivotally mounted a downwardly extending tongue 20 extending through the slot and terminating in a dog 22 releasably engageable with a carriage drive mechanism generally designated 24. The carriage drive mechanism 24, in the preferred embodiment includes an elongated drive chain 26, having a top flight extending in close proximity to the underside of the carriage support base 12. Chain 26, at the end of base 12 remote from the wrapping wheel support base 11, is trained about a large idler sprocket 28 rotatably mounted upon the support frame 10 below base 12.

The drive chain 26, adjacent the other end of base 12, is trained about small idler sprockets 30, 30, and thereafter about a drive sprocket 32 mounted upon drive shaft 34 extending from a gear reduction mechanism 36. Extending into and driving the speed reducer 36 is the shaft 37 extending from a prime mover which in the illustrated example is an electric motor 38.

The gear reduction mechanism, and the driving connections 26, 28, 30, 32, and 34 extending from said mechanism to the carriage, are designed to produce movement of the carriage from one to the other end of the guide slot 16, at a relatively slow speed, that is, a speed sufficient to permit the worker to place a succession of loose twigs or bundles of wrapping materials against opposite faces of a core element while the core element is being fed longitudinally of the support frame 10 responsive to passage of the carriage 18 from one end of the slot 16 to the opposite end thereof.

The motor 38 is preferably under the control of the worker, and to this end there may be provided a foot treadle 40, readily accessible to the worker when the worker is seated at the table or base 12. The foot treadle 40 is adapted to actuate a normally open control switch 42, that is, upon depression of the treadle, the switch 42 may be closed so as to operate the motor 38. In this way, the operator has the motor under full control, and can start and stop the motor instantly whenever desired. This would be true, for example, when a wreath section has been completed, and the carriage is to be returned to its original, starting position preparatory to wrapping of the next wreath section. It may also be desired to stop the motor at an intermediate stage of manufacture of a wreath section if, for example, the worker finds some of the wrapping materials are misaligned or have not been fully and completely secured to the associated core element.

It is believed sufficiently obvious as not to require special illustration that alternatively, it may be desired to leave the motor continuously running, and start and stop the carriage movement by means of a suitable clutch mechanism adapted for drivingly engaging the drive chain 26 at such times as movement of the carriage is to be effected.

Mounted upon the carriage 16 is a vertically upwardly projecting standard 44, upon which a coller 46 is mounted for vertical adjustment to selected elevations. Collar 46 can be secured in the proper, selected position of adjustment by means of set screw 47.

Rigidly secured to the collar is a horizontally extending bearing sleeve 48, in which is rotatably supported a clip support bar of a retaining clip 50 having elongated jaws spring pressed toward each other, one of said jaws terminating in a hooked end 51 adapted to engage in the aperture A of a connecting sleeve S secured to one end of the core element C of a wreath section to be assembled upon the machine.

The core element and the apertured sleeve are formed as disclosed in application Ser. No. 828,451 filed Aug. 29, 1977 by Monty Scudder and Barclay Townsend, now U.S. Pat. No. 4,144,365.

It will be understood that the sleeve and the core element are not part of the present machine, but rather, comprise components of the workpiece, that is, the wreath section manufactured upon the machine comprising the present invention.

Wrapping Wheel Assembly

In accordance with the invention, there is provided an open center wrapping wheel 52, which is rotatably supported upon vertical wall 53 of the support frame 10, through the provision of a plurality of bearing rollers 54 mounted for free rotational movement upon wall 53 in engagement with and in supporting relation to the periphery of the wheel 52. Wheel 52 is driven at a selected, relatively slow rate of speed, through the provision of a drive means including a drive belt 56 trained about wheel 52, and passing about a drive pulley 58 mounted upon the support frame 10. Drive pulley 58 is driven by shaft 60 extending from the speed reducer 36. It follows that the carriage drive chain 26, and the drive belt 56, are started or stopped simultaneously, since they are both driven from a common prime mover 38 the operation of which is controlled by switch 42. This is desirable, in that whenever the operator finds it necessary or desirable to stop the movement of the carriage 18, it would also be important that the wrapping wheel rotation also be stopped. Again, it is believed sufficiently obvious as not to require special illustration that both the wrapping wheel and the carriage drive chain could be clutch-controlled under the control of the worker, with the drive means for both the wrapping wheel and the carriage being engaged or disengaged by a clutch mechanism common to both of them. It is mainly important that both the wrapping wheel and the carriage be started or stopped simultaneously, in the preferred working embodiment of the invention.

Wrapping wheel 52 is provided, on its periphery, with a single spool 62, carrying a supply of thin but strong wrapping wire W. Spool 62 is removably mounted upon a stub shaft 64, and it is highly desirable that the spool not be permitted completely free rotational movement upon the stub shaft. Rather, it is important that there be a tension maintained between the wire taken from the spool, and the core element C about which the wire is to be spirally wrapped during the manufacture of a wreath section. Accordingly, any suitable expedient for preventing overrun of the spool, so as to assure that the wire fed therefrom will be maintained in a taut condition, may be utilized. In the illustrated example, thus, the spool is under spring restraint, through the provision of a compression coil spring 66 bearing against one end of the spool. A nut 68 threaded upon the stub shaft 64 is adapted to adjust the tension of the spring, according to the desires of the operator.

Fixedly secured to the wrapping wheel, in close proximity to the spool 62, and extending inwardly from the periphery of the spool, is an elongated guide tube 70 for the wire W. The wire, as it uncoils from the spool, extends through the guide tube, it being understood that the interior of the guide tube should be as smooth as possible, to reduce friction between the wire W and the guide tube wall. In any event, the guide tube is preferably of angular form, as illustrated, and at its inner end, is in close proximity to the core element C of the workpiece.

Chuck Assembly

Designated as 72 is a work holding spindle or chuck. The chuck 72 is in the form of an elongated bar, having a longitudinal slot 73 extending from end to end thereof, said slot being so proportioned as to receive the core element C, and permit the core element to be shifted longitudinally within the slot during the manufacture of a wreath section. It is understood, in this regard, that in the preferred form of wreath section, the core element would be of undulant or corrugated form, as best shown in the above-mentioned Scudder et al U.S. Pat. No. 4,144,365. A core element so formed is given added strength and rigidity, by reason of the corrugated or wavy shape thereof, while still being capable of being flexed into a curved condition during the final assembly of the wreath sections into a circular wreath, having the construction illustrated in said U.S. Pat. No. 4,144,365.

By reason of the undulant form of the core element, passage thereof through the slot 73 of the chuck causes the core element to be engaged with the chuck for rotational movement therewith, while still being free to move longitudinally of the chuck during the manufacture of the wreath section.

The chuck 72 is adapted to be intermittently rotated, each rotational movement being through 180°. This presents opposite faces of the core element to the operator, so that the operator can lay facing material F first against one side of the core element, and then against the other side, of core element C.

For the purpose of providing for the intermittent rotational movement of chuck 72, the chuck is mounted in a bearing 74 provided upon chuck support base 11. Secured to the chuck for rotation therewith is a sprocket 76 engaged with a chain 78 that is also trained about drive sprocket 80 mounted for rotation with ratchet 82.

Ratchet 82 is engaged by a pawl 84. Each actuation of the pawl imparts rotational movement to the ratchet, through a predetermined angular distance. By reason of the driving connection between the ratchet and the chuck 72, chuck 72 will, on each of these occasions, rotate through 180°. In this way, first one side and then the other side of the core element C is presented to the user. The rotational movement of the core element is in a direction opposite to the rotational movement of the wrapping wheel, in the working embodiment of the invention.

It is important that overrun of the chuck drive sprocket 80, when it is rotated by the ratchet, be prevented. To this end, there is provided a ball detent 86, which is spring pressed and which is mounted upon a stationary support 87 fixedly attached to the support frame 10. The ratchet wheel is formed with an annular series of ball detent recesses or holes 88, one for each step-by-step advancement of the ratchet wheel. As a result, each one step advancement of the ratchet, through an angular distance represented by a single tooth of the ratchet, disengages the ball detent from one recess, and positions the wheel for engagement of the ball detent in the next following recess or hole 88 of the ratchet. This prevents overrun of the ratchet, and hence of the drive sprocket 80 and chuck 72.

Actuation of the pawl 84 is effected through the provision of a solenoid 90 mounted upon the support frame 10. The solenoid is normally de-energized, and is energized through the provision of wiring connections that include a source of electrical power and a momentary switch 92 readily accessible to the user. Each depression of the switch 92 results in energizing of the solenoid, causing retraction of the solenoid plunger to which the pawl 84 is secured. Pawl 84, being instantaneously retracted, correspondingly advances ratchet 82 through one step. The solenoid is immediately de-energized, and under spring bias the pawl 84 returns to its original position, engaging in back of the next following tooth of the ratchet, so as to actuate the ratchet once again upon the next closing of the momentary switch 92.

Operation

In use of a machine constructed according to the present invention, core elements C would be maintained in a supply convenient to an operator, who would be seated almost directly in front of the wrapping wheel. Each core element would be pre-assembled with a sleeve S at one end. Since the other end of the core element is left bare, it is readily extended through slot 73 of chuck 72. Said other end of the core element is inserted in the slot, and the core element is fed through the slot. Carriage 18 will have been previously disengaged from chain 26, and moved to the end of guide slot 16 nearer wrapping wheel 52, and the sleeve S on core element C will at this time be secured to the carriage by engaging the hook-shaped end 51 of clip 50 in the aperture A of the sleeve S.

The user, after having shifted the carriage to its starting position adjacent the wrapping wheel, will have engaged the dog 22 with the carriage drive chain 26. It is anticipated that the operator would be seated with one hand at one side of the wrapping wheel and the other hand at the other side. The operator grasps a stick or bunch of facing materials F, and upon depression of the foot treadle, energizes the drive mechanism, so that the carriage 18 begins to move in a direction away from the wrapping wheel. At the same time, the wrapping wheel begins to rotate, and spirally wraps the wire W about the facing materials F and core element C to secure the facing material to the core element.

Figure 2:
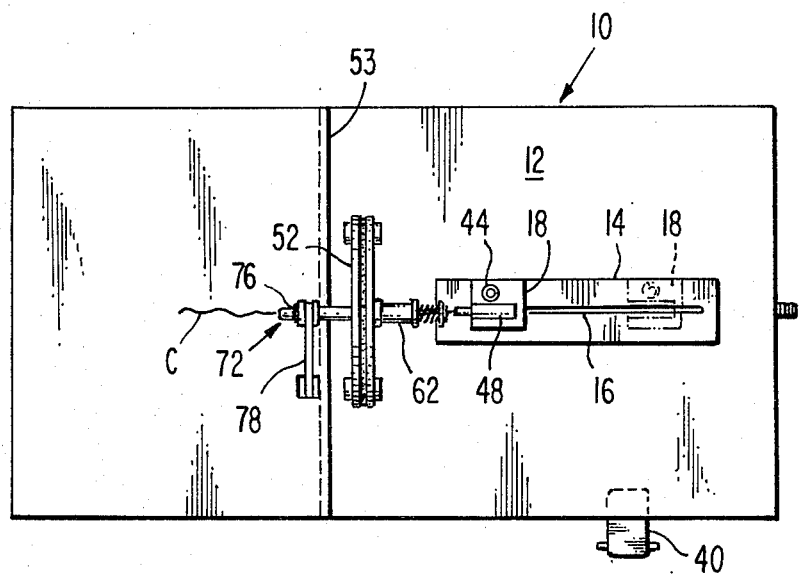
FIG. 2 is a top plan view of the machine.
Figure 3:
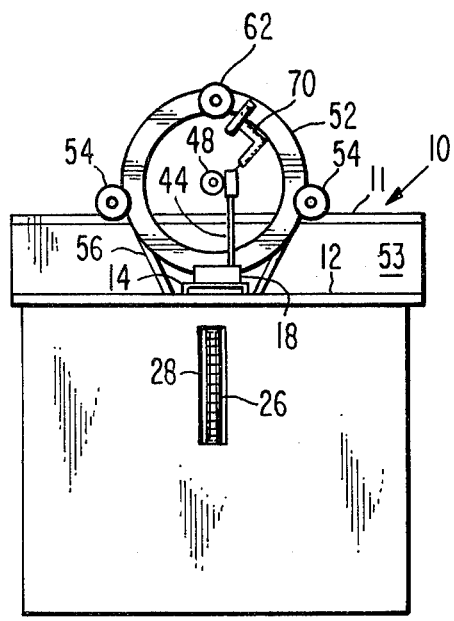
FIG. 3 is an end elevational view of the machine as viewed from the right of FIG. 1.
Figure 4:
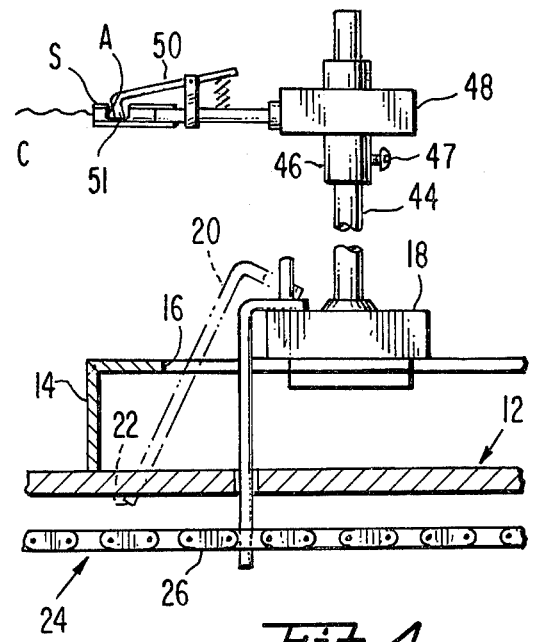
FIG. 4 is an enlarged, fragmentary, side elevational view of a releasable clip mounted upon the work support carriage of the machine, as it appears when engaging a core element of a wreath, the dotted lines illustrating the clip in its released position, said view being taken on line 4—4 of FIG. 2.
Figure 5:
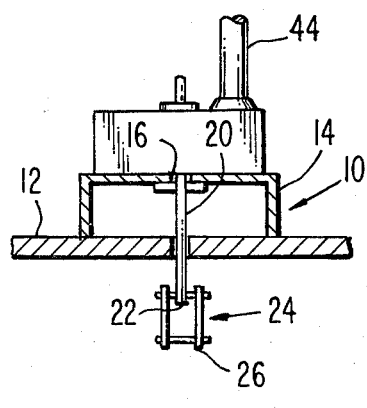
FIG. 5 is an enlarged, detail, transverse sectional view through the carriage means and clip, illustrating the means for releasably engaging the carriage with a carriage drive chain, taken substantially on line 5—5 of FIG. 1.
Figure 6:
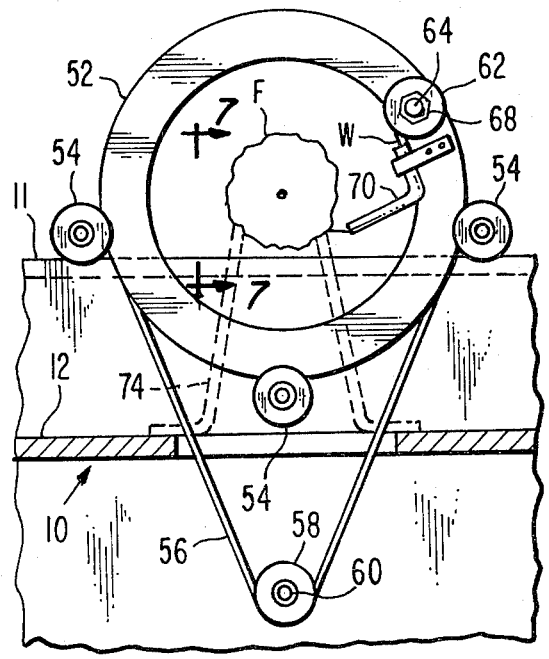
FIG. 6 is a view taken substantially on line 6—6 of FIG. 1, illustrating the wrapping wheel construction and mounting, the scale being enlarged above that of FIG. 1.
Figure 7:
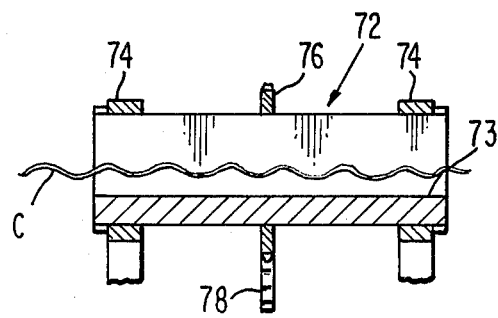
FIG. 7 is an enlarged, detail sectional view taken substantially on line 7—7 of FIG. 6, illustrating in longitudinal section the chuck or support bar for the core element of the wreath.
Figure 8:
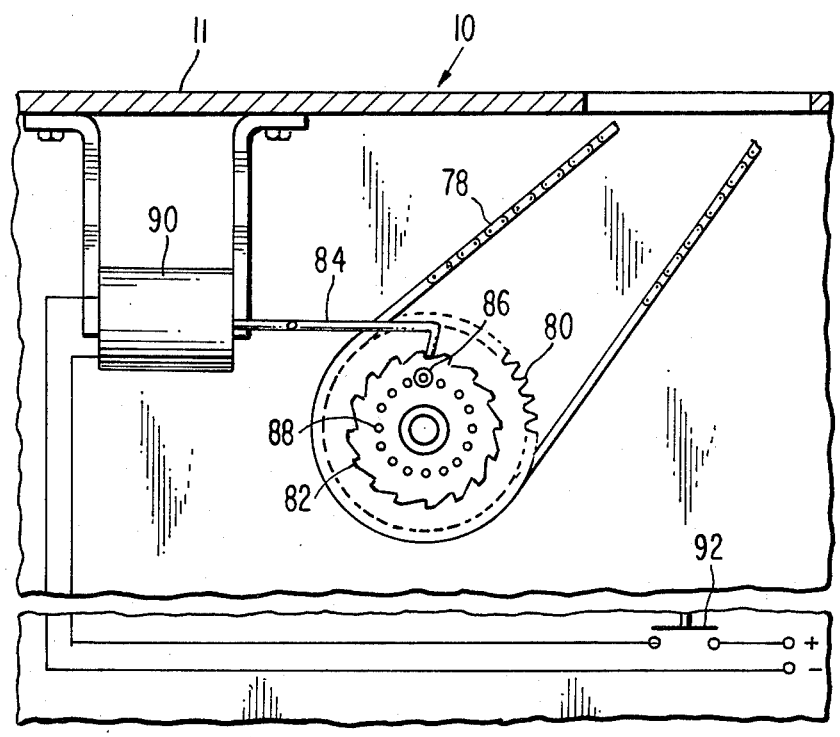
FIG. 8 is an enlarged view of a pawl-and-ratchet means for intermittently rotating the chuck.

As wrapping of the initial stick or bundle of facing materials nears completion, the operator is free to grasp another bundle of wrappings. The operator would reach with one hand for the second bundle or stick of wrappings or facing materials, while with the other hand the operator actuates the push button 92 to energize the solenoid 90. This snap-rotates the chuck 72 through 180°, responsive to the one-step advancement of the ratchet wheel 82 resulting from energizing of the solenoid. This presents the other side of the core element C to the operator, who now places the second bundle of facing materials against this newly exposed side of the core element. The wrapping operation continues, and the operator may alternately, as the carriage moves the full length of guide slot 16 away from the wrapping wheel, cover or sheath the entire core element with the facing material F. The core element, of course, is being fed through the chuck, to the right as viewed in FIGS. 1 and 2, and will have been almost fully retracted from the chuck at the completion of the wreath wrapping operation. The user now stops rotation of the wrapping wheel and movement of the carriage, disengages clip 50 from the wreath section, and pulls the core element fully out of the chuck, and cuts and secures the wrapping wire W. Then, the wreath section is packed with other previously formed, similar sections, for shipment. At its destination, the wreath section is assembled in end-to-end relation with other similar sections for the purpose of forming a continuous, circular, completed wreath.

When the core element has been fully wrapped to provide a completed section of a wreath of the kind disclosed and claimed in the above-mentioned Scudder et al U.S. Pat. No. 4,144,365, the worker begins fabrication of the next similar wreath section by inserting a fresh core element through the slot of the chuck, releasing the dog 22 from drive chain 26, and shifting the carriage toward the wrapping wheel. The operator then wraps the free end of wire W about the core, positions a fresh bundle of facing material against the core, and with the carriage re-engaged with the drive chain, initiates the advancement of the carriage and the rotation of the wrapping wheel in the manner previously described herein.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A machine for making wreaths of the type having a plurality of connected sections each of which is formed of a core element, decorative facings thereon, and a wrapping wire for binding said facings to the core element, comprising:

(a) a support frame;
(b) a carriage mounted for sliding movement upon said support frame, said carriage including an upright and a clip rotatably mounted upon said upright, said clip being adapted for releasably gripping one end of a core element to be wrapped with facing materials, and a dog depending from the carriage;
(c) a wrapping wheel rotatably mounted upon the support frame, said wrapping wheel including an annular member having an open center, and a spool rotatably mounted upon the periphery of the annular member, said carriage being movable upon the support frame in a direction away from the wheel and being adapted to support a core element with the length of the core element extending substantially axially of the wheel, whereby to feed the core element through the wheel responsive to slidable movement of the carriage away from the wrapping wheel and thus spirally wrap said wire about the core element and about facings applied thereto as the core element is fed through the wheel with the wheel being rotated thereabout;
(d) a drive means for the wrapping wheel and said carriage, said drive means being adapted to be started and stopped under the control of a user, for conjoint starting, stopping, and movement of the wrapping wheel and carriage, said dog of the carriage being adapted for releasable engagement with the drive means, whereby to free the carriage for return to a starting position adjacent the wrapping wheel following the wrapping of a core element after the core element has been fed through the wrapping wheel;
(e) a support bar for the core element mounted upon the support frame for rotational movement about an axis common to the axis of rotation of said clip means, said support bar having an end-to-end passage in which the core element is freely slidable, said support bar and said carriage being mounted upon the support frame at opposite sides of the wrapping wheel;
(f) ratchet-in-pawl means mounted upon the support frame, including a ratchet, and a pawl operable independently of the drive means for the wrapping wheel and carriage, at times selected by a user; and
(g) a driving connection from the ratchet to the support bar, adapted for imparting rotational movement to the support bar responsive to each advancement of the ratchet by the pawl, said driving connection being adapted to rotate the support bar through substantially 180° upon each one-step advancement of the ratchet, whereby to present, in alternating relation, opposite sides of the core element to a user to permit the user to apply facings to both sides of the core element at the user's option, while the core element is being fed through the wrapping wheel.

2. A machine for making wreaths of the type having a plurality of connected sections each of which is formed of a core element, decorative facings to the core element, comprising:

(a) a support frame;
(b) a carriage mounted for rectilinear movement upon said support frame, said carriage including rotatable gripping means for releasably holding one end of a core element to be wrapped with facing materials;
(c) a wrapping wheel rotatably mounted upon the support frame, said wrapping wheel including an annular member having an open center, and a spool rotatably mounted upon the periphery of the annular member, said carriage being movable upon the support frame in a direction away from the wheel and being adapted to support a core element with the length of the core element extending substantially axially of the wheel, whereby to feed the core element through the wheel responsive to movement of the carriage away from the wrapping wheel and thus spirally wrap said wire about the core element and about facings applied thereto as the core element is fed through the wheel with the wheel being rotated thereabout;

(d) drive means for the wrapping wheel and carriage adapted to be started and stopped under the control of a user, for conjoint starting, stopping, and movement of the wrapping wheel and carriage, said carriage being adapted for releasable engagement with the drive means, whereby to free the carriage for return to a starting position adjacent the wrapping wheel following the wrapping of a core element after the core element has been fed through the wrapping wheel;

(e) a support member for the core element mounted upon the support frame for rotational movement about an axis common to the axis of rotation of said gripping means, said support member having an end-to-end passage in which the core element is freely slidable, said support member and carriage being mounted upon the support frame at opposite sides of the wrapping wheel;

(f) means mounted upon the support frame for rotating the support member, operable independently of the drive means for the wrapping wheel and carriage, at times selected by a user; and (g) a driving connection from the support-member-rotating means, adapted for imparting rotational movement to the support member responsive to each advancement of the ratchet by the pawl, said driving connection being adapted to rotate the support bar through an angular distance less than 360° upon each one-step advancement of the ratchet, whereby to present, in sequence, different angularly spaced sides of the core element to a user to permit the user to apply facings to said sides of the core element while it is being fed through the wrapping wheel.

* * * * *

UNITED STATES PATENT AND TRADEMARK OFFICE
CERTIFICATE OF CORRECTION

PATENT NO. : 4,277,885
DATED : Jul. 14, 1981
INVENTOR(S) : Monty Scudder

It is certified that error appears in the above–identified patent and that said Letters Patent are hereby corrected as shown below:

Column 2, Line 21, change "or" to --of--

Column 4, Line 15, change "coller" to --collar--

Column 7, Line 23, delete "and"

Column 8, Line 35, change "ratchet-in-pawl" to --ratchet-and-pawl--

Column 10, Line 5, after "means" insert --including a pawl and ratchet advanced thereby,--

Column 10, Line 6, delete the comma (,) and substitute -- and--

Column 10, Line 14, change "bar" to --member--

Signed and Sealed this

Twenty-third Day of March 1982

|SEAL|

*Attest:*

*Attesting Officer*

GERALD J. MOSSINGHOFF

*Commissioner of Patents and Trademarks*